(12) United States Patent
Ishii et al.

(10) Patent No.: US 8,305,909 B2
(45) Date of Patent: Nov. 6, 2012

(54) NETWORK INFORMATION ANALYZING METHOD AND APPARATUS

(75) Inventors: Hiroyuki Ishii, Kawasaki (JP); Satoshi Motohashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1088 days.

(21) Appl. No.: 11/842,334

(22) Filed: Aug. 21, 2007

(65) Prior Publication Data
US 2007/0288624 A1 Dec. 13, 2007

Related U.S. Application Data

(63) Continuation of application No. PCT/JP2005/003943, filed on Mar. 8, 2005.

(51) Int. Cl.
H04L 12/26 (2006.01)
(52) U.S. Cl. .......................... 370/244; 370/248; 709/224
(58) Field of Classification Search .................. None
See application file for complete search history.

(56) References Cited

U.S. PATENT DOCUMENTS

| | | | | |
|---|---|---|---|---|
| 5,331,628 A | * | 7/1994 | Cheng et al. | 370/248 |
| 5,668,800 A | * | 9/1997 | Stevenson | 370/248 |
| 5,721,727 A | * | 2/1998 | Ashi et al. | 370/244 |
| 5,974,027 A | * | 10/1999 | Chapman | 370/228 |
| 6,094,682 A | * | 7/2000 | Nagasawa | 709/224 |
| 6,104,702 A | * | 8/2000 | Vissers | 370/241 |
| 6,545,980 B1 | * | 4/2003 | Dive et al. | 370/242 |
| 6,628,674 B1 | * | 9/2003 | Tanonaka | 370/503 |
| 7,002,907 B1 | * | 2/2006 | Chen et al. | 370/222 |
| 7,058,012 B1 | * | 6/2006 | Chen et al. | 370/222 |
| 7,062,554 B1 | * | 6/2006 | Gallagher et al. | 709/224 |
| 7,139,824 B2 | * | 11/2006 | Grech et al. | 709/224 |
| 7,170,851 B1 | * | 1/2007 | Chen et al. | 370/222 |
| 7,426,179 B1 | * | 9/2008 | Harshavardhana et al. | 370/219 |
| 7,751,726 B1 | * | 7/2010 | Gazzola et al. | 398/202 |

(Continued)

FOREIGN PATENT DOCUMENTS

JP 8-130559 5/1996

(Continued)

OTHER PUBLICATIONS

International Search Report mailed Apr. 26, 2005, from the corresponding International Application.

*Primary Examiner* — Gregory Sefcheck
(74) *Attorney, Agent, or Firm* — Katten Muchin Rosenman LLP

(57) ABSTRACT

A network information analyzing method is disclosed for determining the status of a network including plural communication apparatuses. The method involves assigning a line identifier to each logical line used for establishing data communication between a transmission terminal and a reception terminal, transmitting from a management apparatus to the communication apparatuses line management code information including the line identifier, controlling each communication apparatus to output the received line management code information to the logical line identified by the line identifier included in the received line management code information, controlling each communication apparatus to extract the line management code information from a transmission signal and transmit a corresponding apparatus identifier and the extracted line management code information to the management apparatus, and analyzing the status of the network at the management apparatus based on the corresponding apparatus identifier and the extracted line management code information received from each communication apparatus.

10 Claims, 12 Drawing Sheets

U.S. PATENT DOCUMENTS

| | | |
|---|---|---|
| 2002/0031087 A1 | 3/2002 | Gotoh et al. |
| 2003/0093709 A1 | 5/2003 | Ogawa et al. |
| 2003/0112800 A1* | 6/2003 | Grech et al. .................. 370/389 |
| 2005/0099951 A1* | 5/2005 | Mohan et al. ................. 370/241 |
| 2005/0099952 A1* | 5/2005 | Mohan et al. ................. 370/241 |
| 2006/0064479 A1* | 3/2006 | Meged et al. ................. 709/224 |
| 2006/0126521 A1* | 6/2006 | Hyndman et al. ............ 370/248 |

FOREIGN PATENT DOCUMENTS

| | | |
|---|---|---|
| JP | 8-139730 | 5/1996 |
| JP | 2001-217901 | 8/2001 |
| JP | 2002-084249 | 3/2002 |
| JP | 2003-152721 | 5/2003 |

* cited by examiner

FIG.4

| LINE MANAGEMENT CODE | TRANSMISSION APPARATUS | RECEPTION APPARATUS | TRANSMISSION TERMINAL | RECEPTION TERMINAL | PASS APPARATUS |
|---|---|---|---|---|---|
| 000001h | a | b | 1 | d | cde |
| 000002h | a | b | 1 | d | cde |
| 000003h | b | a | 2 | d | edc |
| 000004h | b | a | 3 | d | edc |
| 000005h | - | - | - | - | - |
| 000006h | - | - | - | - | - |
| 000007h | - | - | - | - | - |
| 000008h | - | - | - | - | - |
| 000009h | - | - | - | - | - |

FIG.8

| LINE MANAGEMENT CODE | TRANSMISSION APPARATUS | RECEPTION APPARATUS | PASS APPARATUS | | VENDOR CODE | LINE DIRECTION CODE |
|---|---|---|---|---|---|---|
| 000001h | a | b | c | d | 1 | UPSTREAM |
| 000002h | a | b | c | d | 1 | UPSTREAM |
| 000003h | b | a | e | d | 3 | DOWNSTREAM |
| 000004h | b | a | e | d | 3 | DOWNSTREAM |
| 000005h | — | — | — | — | — | — |
| 000006h | — | — | — | — | — | — |
| 000007h | — | — | — | — | — | — |
| 000008h | — | — | — | — | — | — |
| 000009h | — | — | — | — | — | — |

FIG.9

| TRANSMISSION APPARATUS NAME | TERMINAL | LINE DIRECTION | TRANSMISSION /RECEPTION | LINE MANAGEMENT CODE | TRANSMISSION CAPACITY |
|---|---|---|---|---|---|
| TRANSMISSION APPARATUS a | a1~c1 | LINE DIRECTION 1 | TRANSMISSION | 00001h | 64K |
| | b1~d3 | LINE DIRECTION 1 | TRANSMISSION | 00002h~7h | 384K |
| | b1~d3 | LINE DIRECTION 1 | TRANSMISSION | 00008h | 64K |
| | b1~d3 | LINE DIRECTION 1 | TRANSMISSION | 00009h~x | 6.44K |
| | b1~d3 | LINE DIRECTION 2 | TRANSMISSION | xxxx | 64K |
| | b1~d3 | LINE DIRECTION 2 | TRANSMISSION | xxxx | 64K |
| | | | | USED TRANSMISSION CAPACITY | 7.08Mbps |
| | | | | FREE TRANSMISSION CAPACITY | 114Mbps |

FIG.12

| LINE MANAGEMENT CODE | TRANSMISSION APPARATUS | PASS APPARATUS | | | RECEPTION APPARATUS | VENDOR CODE | LINE DIRECTION CODE | RESULT |
|---|---|---|---|---|---|---|---|---|
| 000001h | a | c | d | e | b | 1 | UPSTREAM | NG |
| 000002h | a | c | d | e | b | 1 | UPSTREAM | NG |
| 000003h | b | e | d | c | a | 3 | DOWNSTREAM | OK |
| 000004h | b | e | d | c | a | 3 | DOWNSTREAM | OK |
| 000005h | – | – | – | – | – | – | – | – |
| 000006h | – | – | – | – | – | – | – | – |
| 000007h | – | – | – | – | – | – | – | – |
| 000008h | – | – | – | – | – | – | – | – |
| 000009h | – | – | – | – | – | – | – | – |

NETWORK INFORMATION ANALYZING METHOD AND APPARATUS

CROSS REFERENCE TO RELATED APPLICATIONS

This application is a U.S. continuation application filed under 35 USC 111(a) claiming benefit under 35 USC 120 and 365 (c) of PCT application JP2005/003943, filed Mar. 8, 2005, the contents of which are hereby incorporated by reference in their entirety.

BACKGROUND OF THE INVENTION

1. Field of the Invention

The present invention relates to network information analyzing method and apparatus for analyzing the status of a network made up of non-IP-based communication apparatuses.

2. Description of the Related Art

A private network may often be made up of non-IP-based communication apparatuses that are based on diverse networking technologies such as the PDH (Plesiochronous Digital Hierarchy) or SDH (Synchronous Digital Hierarchy) scheme.

A non-IP-based communication apparatus such as a SDH-based communication apparatus may be able to manage network information by assigning a number to each transmission path using overhead bytes; however, such an apparatus is not able to assign a number to each channel within the transmission path.

Therefore, a non-IP based communication apparatus cannot determine the amount of signal traffic flowing within a transmission path. On the other hand, in an IP-based network, although the pass apparatuses forming the communication channel for a packet may be determined each time, since a communication channel may be changed (routing) when the amount of traffic increases, it may not be possible to determine on a regular basis which signals are to pass through which route at which amount so that management of information on communication routes and the free transmission capacity within a transmission path may be difficult, for example.

Japanese Laid-Open Patent Publication No. 2001-217901 discloses a technique for assigning an identifier for identifying each wavelength or path contained within a WDM optical communication line to a frame of each wavelength in order to determine the wavelength or path at which an error is occurring and displaying the determination result on a screen.

Japanese Laid-Open Patent Publication No. 8-130559 discloses a technique implemented in a network interconnecting plural stations where a frame with an identifier is transmitted from a start point station and the identifier is identified at an end point station in order to confirm the reliability of the communication path.

In the case of constructing a private network using non-IP-based communication apparatuses by multiple vendors, since individual network designing information is set by each communication apparatus vendor, it is not easy for a user to manage and update information on the communication route of each line and the free transmission capacity within a transmission path based on the network design information (e.g., information on the types of signals passed by each apparatus) obtained from each communication apparatus vendor.

However, when such information is not properly managed and updated, the network status (e.g., the communication routes of each signal and the free transmission capacity within a transmission path) may have to be thoroughly examined from scratch in the case of adding extra terminals to the network to determine the communication route for the added terminal, and this may be quite a burden for the user.

Also, in the case where an error occurs in the network (when the network is not constructed according to design), since confirmation operations are limited to checking conformance with the network design set by each vendor, error detection may take a long time (when the user does not sufficiently maintain and manage the communication route and availably area).

SUMMARY OF THE INVENTION

Embodiments of the present invention are related to techniques for facilitating and increasing the speed of network analyzing processes including determination of a communication route, determination of the amount of signals passing though a communication apparatus, and determination of a network error location, for example.

According to one embodiment of the present invention a network information analyzing method for determining a status of a network including plural communication apparatuses is provided, the method including the steps of:

assigning a line identifier to each logical line used for establishing data communication between a transmission terminal and a reception terminal within the network;

transmitting from a management apparatus to the communication apparatuses line management code information including the line identifier;

controlling each communication apparatus receiving the line management code information to output the received line management code information to the logical line identified by the line identifier included in the received line management code information;

controlling each communication apparatus to extract the line management code information from a transmission signal and transmit a corresponding apparatus identifier assigned to the communication apparatus and the extracted line management code information to the management apparatus; and analyzing the status of the network at the management apparatus based on the corresponding apparatus identifier and the extracted line management code information received from each communication apparatus.

According to another embodiment of the present invention, a communication apparatus is provided that is used in implementing a network analyzing method for analyzing a status of a network including plural communication apparatuses, the communication apparatus including:

a management apparatus transmission/reception unit that receives line management code information including a line identifier assigned to a logical line used for establishing data communication between a transmission terminal and a reception terminal within the network which line management code information is transmitted from a management apparatus that manages the network;

a line management code information output unit that outputs the received line management code information to the logical line identified by the line identifier included in the received line management code information;

a line management code information extracting unit that extracts the line management code information from a transmission signal; and a line management code information transmission unit that transmits to the management apparatus the extracted line management code information and a corresponding apparatus identifier assigned to said communication apparatus.

According to another embodiment of the present invention, a relay apparatus is provided that is used in implementing a network analyzing method for analyzing a status of a network including plural communication apparatuses, the relay apparatus including:

a line management code information extracting unit that extracts line management code information including a line identifier assigned to a logical line used for establishing data communication between a transmission terminal and a reception terminal from a transmission signal; and a line management code information transmission unit that transmits to a management apparatus the extracted line management code information and a corresponding apparatus identifier assigned to said relay apparatus.

According to another embodiment of the present invention, a management apparatus is provided that is used in implementing a network analyzing method for analyzing a status of a network including plural communication apparatuses, the management apparatus including:

a database that assigns a line identifier to each logical line used for establishing data communication between a transmission terminal and a reception terminal within the network and registers line management code information including the line identifier;

a transmission unit that transmits the registered line management code information to the communication apparatuses;

a reception unit that receives from the communication apparatuses extracted line management code information extracted by the communication apparatuses; and an analyzing unit that analyzes the status of the network based on the extracted line management code information received from the communication apparatuses.

BRIEF DESCRIPTION OF THE DRAWINGS

FIG. 4 is a table illustrating a configuration of line management code information stored in a management code database of a management apparatus according to an embodiment of the present invention;

FIG. 8 is a table representing an exemplary display of a communication route list;

FIG. 9 is a table representing an exemplary display of a capacity compilation list;

FIG. 12 is a table representing an exemplary display of a communication route list that may be displayed when an error occurs.

DESCRIPTION OF THE PREFERRED EMBODIMENTS

In the following, preferred embodiments of the present invention are described with reference to the accompanying drawings.

Figure 1:
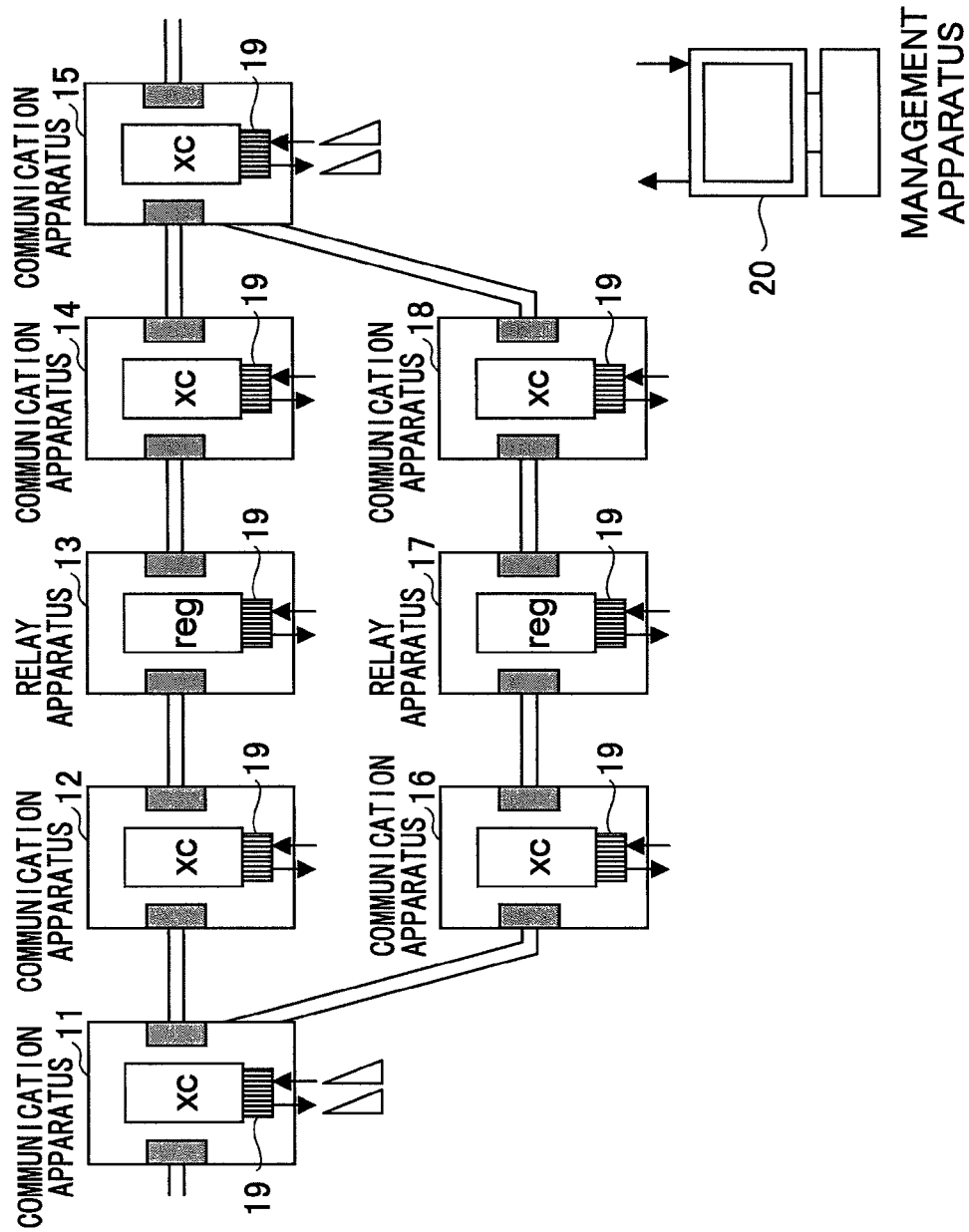
FIG. 1 is a diagram showing a configuration of a network in which an embodiment of the present invention is implemented.

FIG. 1 is a diagram showing a configuration of a network in which an embodiment of the present invention is implemented.

In the illustrated network, communication apparatus 11 is connected to communication apparatus 15 via communication apparatus 12, relay apparatus 13, and communication apparatus 14. Also, communication apparatus 11 is connected to communication apparatus 15 via communication apparatus 16, relay apparatus 17, and communication apparatus 18. In the following descriptions, the communication apparatuses 11, 12, 14-16, 18 and the relay apparatuses 13 and 17, which correspond to non-IP-based communication apparatuses such as SDH nodes, may be collectively referred to as communication apparatuses.

Each of the communication apparatuses (including the relay apparatuses) has a management transmission/reception unit 19 that is connected to a management apparatus 20 by a communication line that is different from the transmission path of the network.

In FIG. 1, a data communication path between a transmission terminal and a reception terminal such as the data communication path between a transmission terminal connected to communication apparatus 11 and a reception terminal connected to communication apparatus 15 via communication apparatuses 12, 13, and 14 is referred to as a logical line, and the management apparatus 20 manages line management code (line identifier) assigned to each logical line established within the network.

Figure 2:
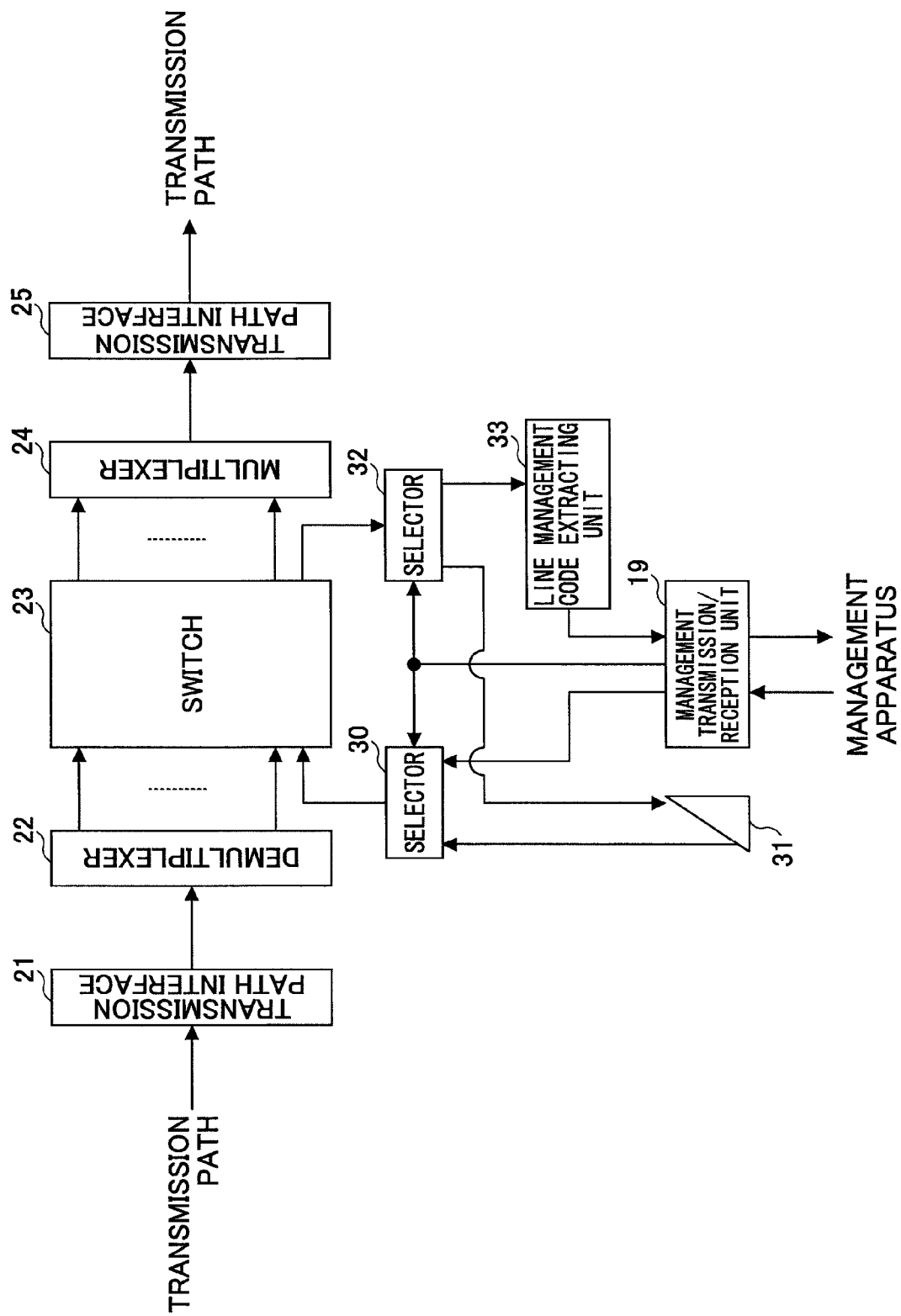
FIG. 2 is a block diagram showing a configuration of a communication apparatus according to an embodiment of the present invention.

FIG. 2 is a block diagram showing a configuration of a communication apparatus used in an embodiment of the present invention. In this drawing, a transmission path interface 21 receives a multiplexed signal from a network transmission path and supplies the received signal to a demultiplexer 22. The demultiplexer 22 demultiplexes the multiplexed signal and supplies the demultiplexed signals to a switch 23. The signals switched by the switch 23 are multiplexed by the multiplexer 24 to be transmitted to the network transmission path via a transmission path interface 25.

The management transmission/reception unit 19 is configured to receive a signal from the management apparatus 20 and supply line management code information contained in the received signal to a selector 30. The selector 30 receives an output signal of a terminal 31 corresponding to a transmission terminal. The management transmission/reception unit 19 controls operations of the selector 30 according to operating mode information contained in the received signal from the management apparatus 20. Specifically, the management transmission/reception unit 19 controls the selector 30 to select the output signal of the terminal 31 in normal mode, and controls the selector 30 to select the line management code information in maintenance/alarm mode. The signal selected by the selector 30 is supplied to the multiplexer 24 via the switch 23 to be multiplexed with other signals and output to the network transmission path.

As can be appreciated, in maintenance/alarm mode, line management code information from the management apparatus 20 is output to a corresponding logical line instead of data from the terminal 31.

The switch 23 supplies a signal to be output to the terminal 31 to a selector 32. The selector 32 operates according to the operations mode designated by the management transmission/reception unit 19. Specifically, in normal mode, the selector 32 supplies a signal of a specific channel to the terminal 31, and in maintenance/alarm mode, the selector 32 supplies the signal of the specific channel to a line management code extracting unit 33.

The line management code extracting unit 33 extracts line management code information based on the signal supplied from the selector 32 and supplies the extracted line management code information to the management transmission/reception unit 19. The management transmission/reception unit 19 transmits the line management code information and its corresponding apparatus code (apparatus identifier) to the management apparatus 20. It is assumed in the present embodiment that an apparatus code for identifying each of the communication apparatuses (including the relay apparatuses) of the network is registered beforehand.

It is noted that although only one terminal 31 is shown in FIG. 2, plural terminals may be connected to a communication apparatus in other embodiments, and in such a case, the management transmission/reception unit 19, the selectors 30, 32, and the line management code extracting unit 33 may be configured to perform the above-described processes on each of the terminals connected thereto.

Figure 3:
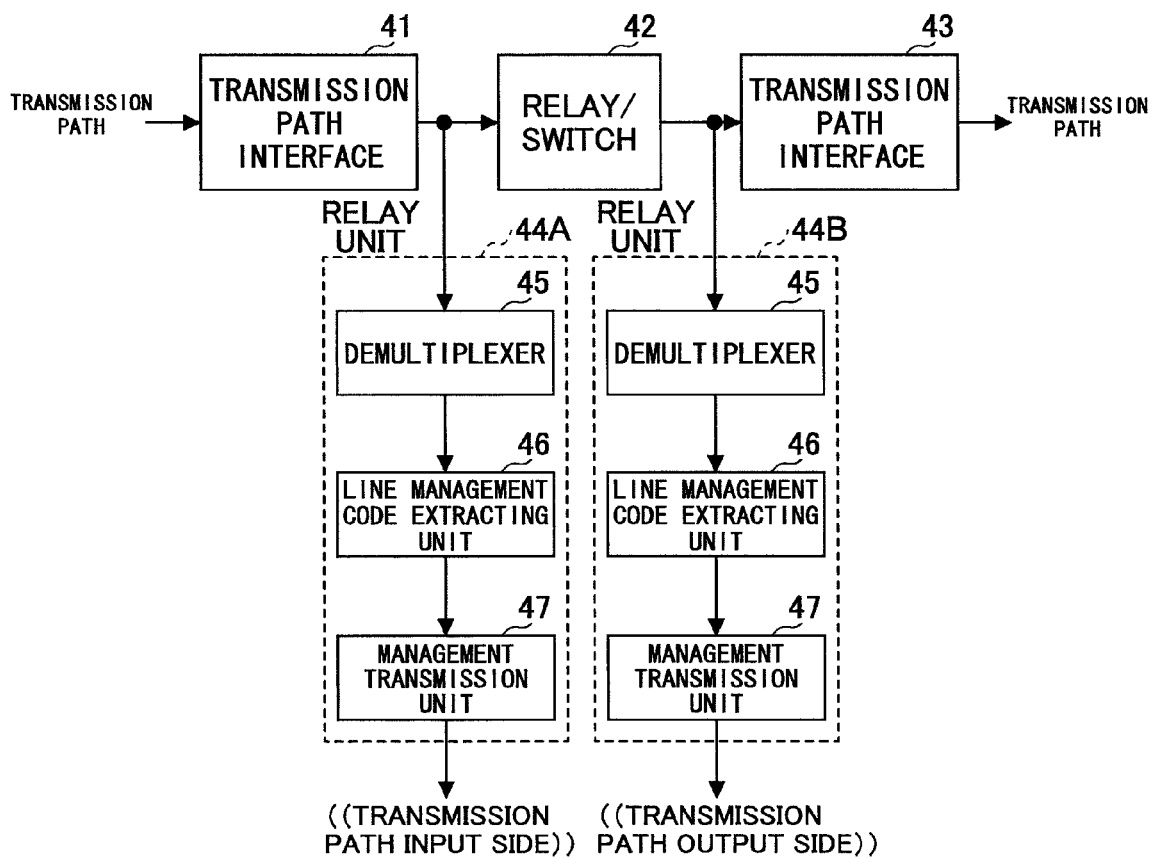
FIG. 3 is a block diagram showing relay units that are included in a communication apparatus according to an embodiment of the present invention.

FIG. 3 is a block diagram showing relay units that are included in each of the communication apparatuses (including the relay apparatuses) used in an embodiment of the present invention. In this drawing, a network transmission path interface 41 receives a multiplexed signal from the network transmission path and supplies the received multiplexed signal to the relay/switch unit 42 at which the multiplexed signal is amplified or switched. The switched/amplified signal is then transmitted to the network transmission path via a transmission path interface 43. It is noted that the relay/switch unit 42 amplifies the multiplexed signal in a relay apparatus and switches the multiplexed signal in a communication apparatus.

Relay units 44A and 44B are respectively arranged at the transmission path input side and the transmission path output side of each of the communication apparatuses. The relay units 44A and 44B each include a demultiplexer 45 that demultiplexes a multiplexed signal and supplies the demultiplexed signals to a line management code extracting unit 46. The line management code extracting unit 46 extracts line management code information from each channel (line) and supplies the extracted line management code information to a management transmission unit 47, which transmits the line management code information to the management apparatus 20.

FIG. 4 is a table illustrating an exemplary configuration of line management code information stored in a management code database (DB) 50 of the management apparatus 20. In the illustrated example, a predetermined bandwidth (e.g., 64 Kbps) is perceived as one channel regardless of frame formats defined by the SDH or other schemes and a line management code that is unique to each line within the network is assigned. As is shown in this drawing, identifiers (codes) for identifying the transmission apparatus (communication apparatus), the reception apparatus (communication apparatus), the transmission terminal, the reception terminal, and the passing apparatuses (communication apparatus/relay apparatus) of each line are registered beforehand in the management code DB 50. Such information may be registered based on network design information that can be obtained from vendors of the communication apparatuses, for example. It is noted that the symbol 'h' attached to the end of each line management code shown in FIG. 4 denotes that the code is represented in hexadecimal form.

Figure 5:
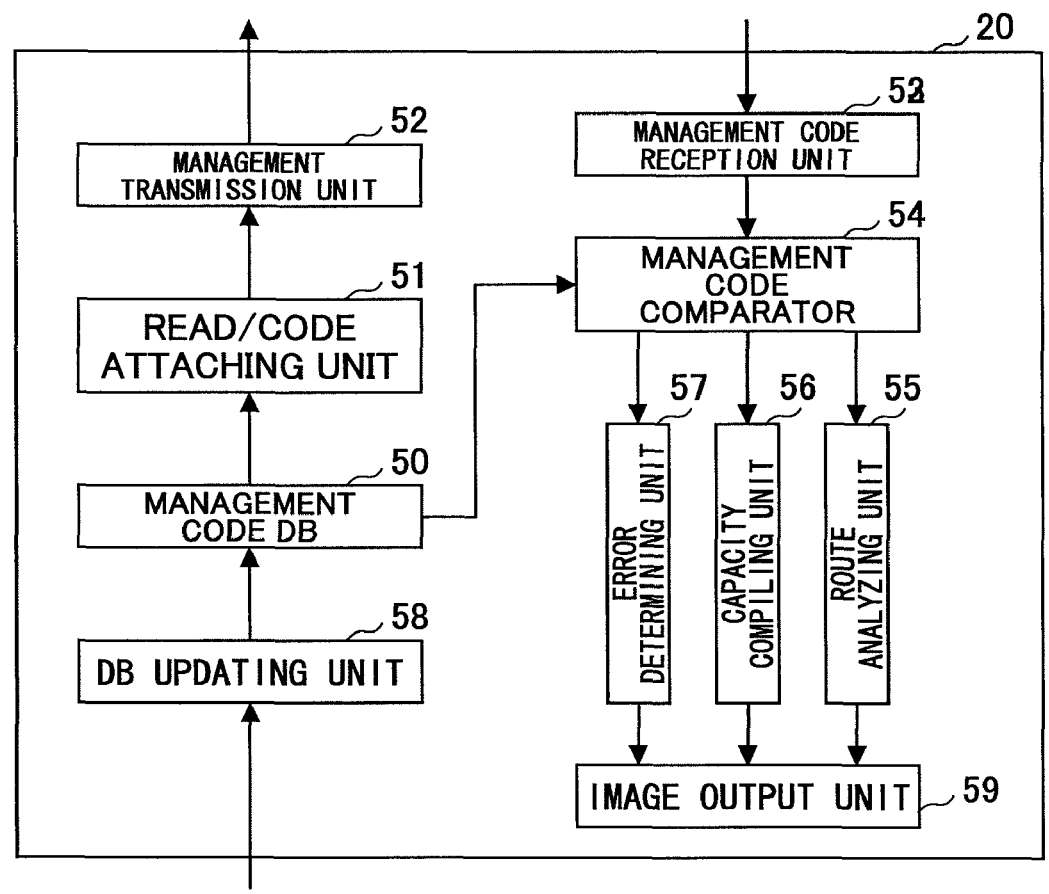
FIG. 5 is a block diagram showing a configuration of the management apparatus according to an embodiment of the present invention.

FIG. 5 is a block diagram illustrating a functional configuration of the management apparatus 20 according to an embodiment of the present invention. In maintenance/alarm mode, a read/code attaching unit 51 reads line management code information of each line management code from the management code DB 50; attaches a line direction code (upstream or downstream) representing the direction of the line identified by the line management code, a vendor code identifying the vendor of the transmission apparatus, a transmission terminal code, a reception terminal code, a transmission apparatus code, and a reception apparatus code to the line management code information; and supplies the resulting line management code information to a management code transmission unit 52. The management code transmission unit 52 transmits the line management code information to the transmission apparatus that is identified by the transmission apparatus code included in the line management code information.

A management code reception unit 53 receives line management code information from each of the communication apparatuses and relay apparatuses of the network in maintenance/alarm mode and supplies the received line management code information to a management code comparator 54.

The management code comparator 54 compares the line management code of the received line management code information with the line management code registered in the management code DB 50, and supplies the comparison result along with the received line management code information to a route analyzing unit 55, a capacity compiling unit 56, an error determining unit 57, and a DB updating unit 58.

Figure 6:
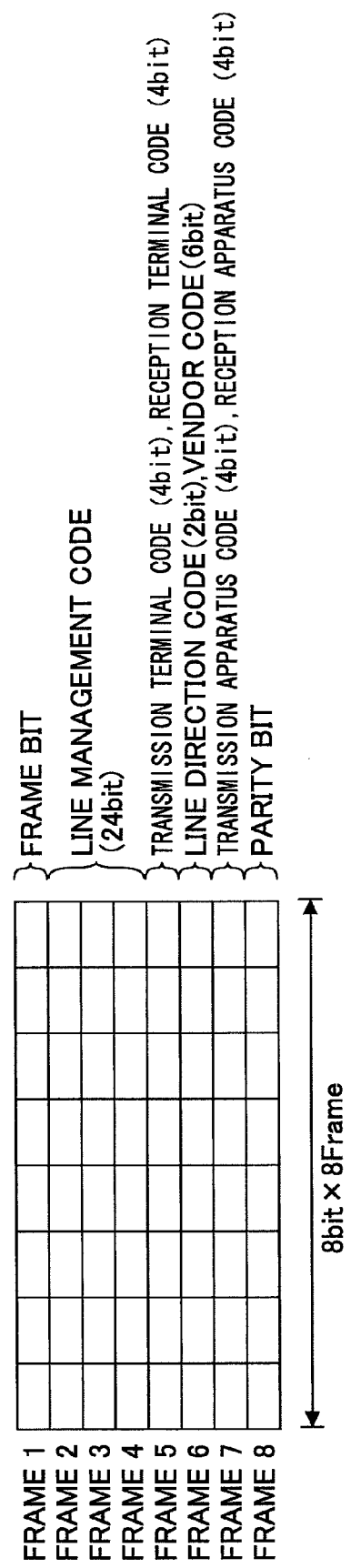
FIG. 6 is a diagram illustrating a multi-frame format of the line management code information.

FIG. 6 is a diagram illustrating exemplary line management code information in multi-frame format. In the illustrated example, the line management code information is made up of eight frames with each frame including eight bits of information. Frame bits of a predetermined bit pattern used for synchronization are arranged in the first frame (frame 1). A line management code of twenty four (24) bits is arranged in the second to fourth frames (frames 2-4) A transmission terminal code and a reception terminal code are arranged in the fifth frame (frame 5), and a line direction code (2 bits) and a vendor code (6 bits) are arranged in the sixth frame. A transmission apparatus code and a reception apparatus code are arranged in the seventh frame (frame 7), and parity bits for the first to seventh frames are arranged in the eighth frame (frame 8).

In the present example, since only eight bits can be transmitted within one frame, the management code transmission unit 52 divides the multi-frame line management code information of sixty four (64) bits into eight frames and sequentially transmits the divided frames. The management code reception unit 53 accumulates data amounting to eight frames and supplies the accumulated data to the management code comparator 54 after establishing synchronization and checking the parity bits.

The route analyzing unit 55 compiles information for each of the line management codes based on the line management code information received from the communication apparatuses and relay apparatuses of the network to display a communication route list of each communication route or channel (transmission path of a specific channel) on a display screen via an image output unit 59.

Figure 7:
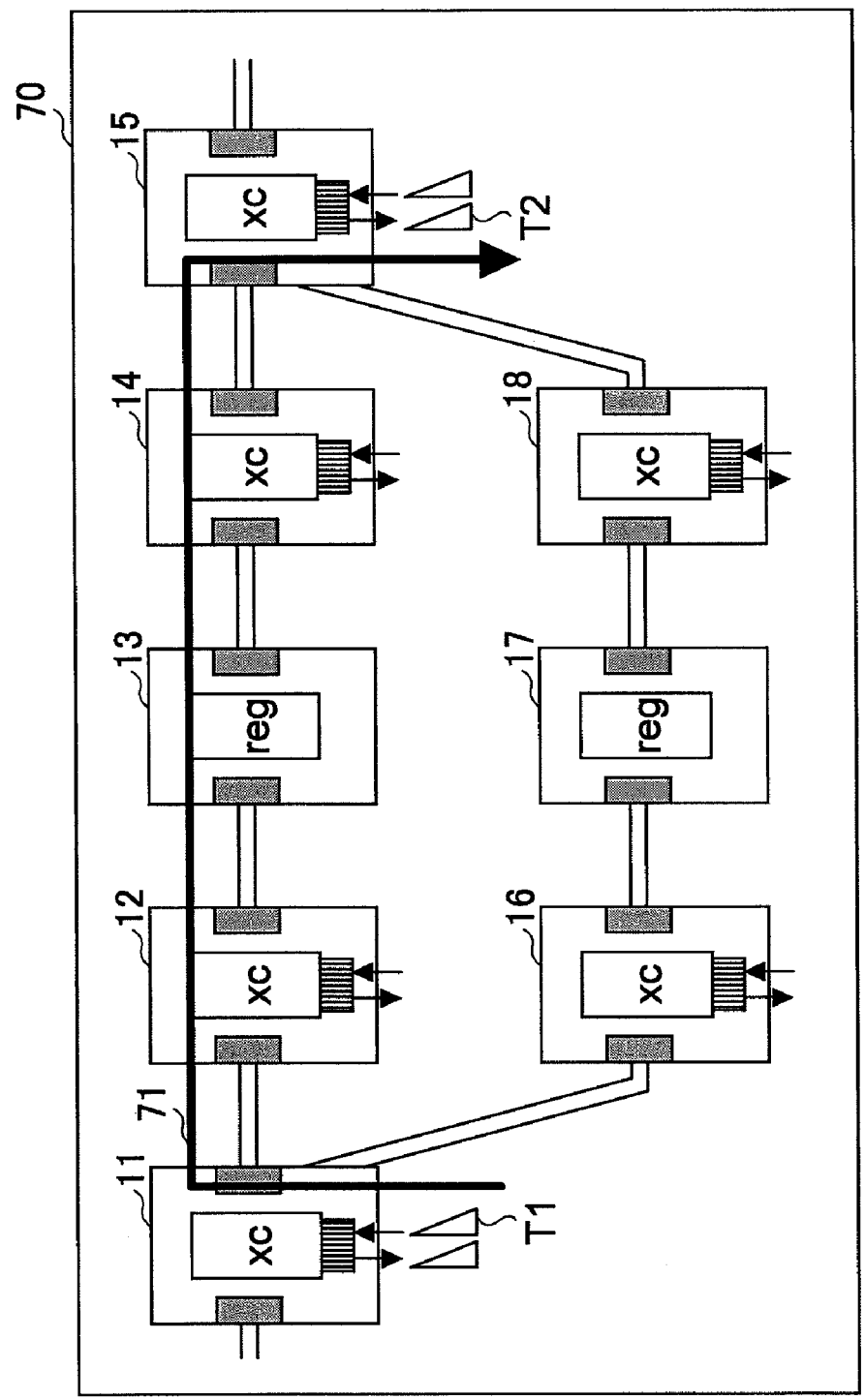
FIG. 7 is a diagram showing an exemplary display of a communication route of a specific channel.

FIG. 7 is a diagram illustrating a display screen showing a communication route of a specific channel. The illustrated display screen 70 shows a communication route represented by arrow 71 within a network made up of communication apparatuses 11, 12, 14-16, and 18 and relay apparatuses 13 and 17. Arrow 71 represents a communication route of a specific channel having a specific line management code, namely, a communication route that passes through terminal T1, communication apparatuses 11, 12, relay apparatus 13, communication apparatus 14, 15, and terminal T2.

FIG. 8 is a table illustrating an exemplary display of a communication route list. The illustrated communication route list indicates the transmission apparatus, the reception apparatus, the passing apparatuses, the transmission apparatus vendor code, the transmission terminal code, the reception terminal code, and the line direction code for each line management code.

The capacity compiling unit 56 compiles information for each of the communication apparatuses based on the line management code information received from the communication apparatuses and relay apparatuses of the network. When the line management code information of two or more channels for a specific communication apparatus includes the same transmission terminal code and reception terminal code, the capacity compiling unit 56 groups the channels together, assigns their line management codes, and compiles their transmission capacities. It is noted that the transmission capacities of the channels may be compiled by adding the corresponding channel transmission capacities together. A specific communication apparatus may be designated from an input device such as a keyboard of the management apparatus 20, for example. In turn, the capacity compiling unit 56 may display a capacity compilation list of a designated communication apparatus on a display screen via the screen output unit 59.

FIG. 9 shows an exemplary display of a capacity compilation list. The illustrated compilation list is compiled for communication apparatus 'a'. The first item of the list describes upstream ('direction 1') communication from transmission terminal 'a1' to reception terminal 'c1' in which the communication apparatus 'a' performs transmission using a channel identified by line management code '00001h' with a transmission capacity of 64 Kbps. The second item of the list describes upstream ('direction 1') communication from transmission terminal 'b1' to reception terminal 'd3' in which the transmission apparatus 'a' performs transmission using six channels identified by line management codes '00002h-7h' with a transmission capacity equal to that of six channels, namely, 384 Kbps.

The illustrated compilation list also indicates a used transmission capacity of 7.08 Mbps representing a total of the transmission capacities of the listed communication channels and a free transmission capacity of 114 Mbps representing a difference obtained by subtracting the used transmission capacity from the maximum transmission capacity of the communication apparatus 'a' that is stored in the management apparatus 20.

The error determining unit 57 determines an error occurring location based on the line management code information received from the communication apparatuses and the relay apparatuses.

Figure 10:
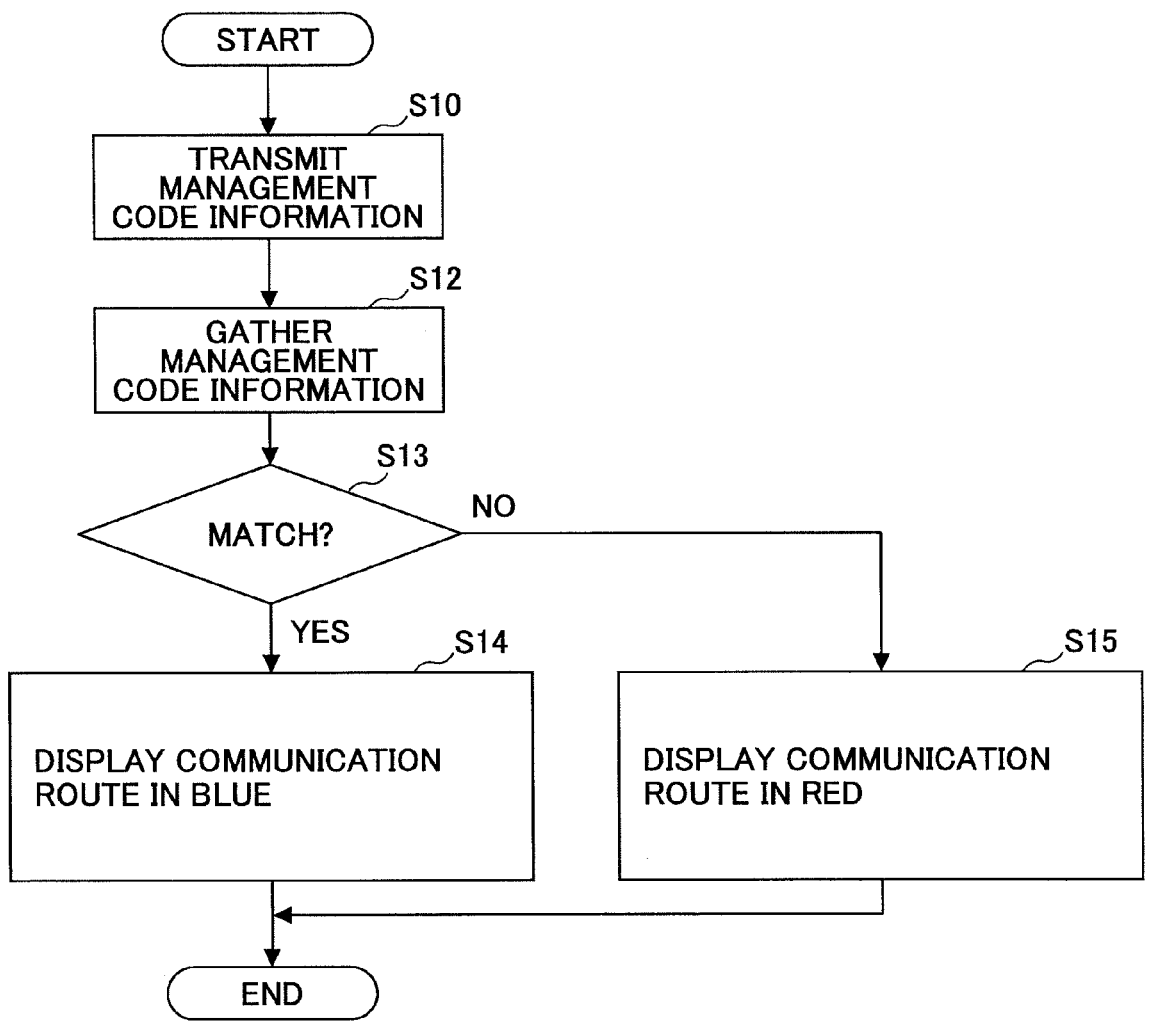
FIG. 10 is a flowchart illustrating an error determination process.

FIG. 10 is a flowchart illustrating an exemplary error determination process that is executed by the management apparatus 20 in maintenance/alarm mode. In the illustrated process, the management code transmission unit 52 transmits line management code information of a specific channel to a specific communication apparatus that is identified by the transmission apparatus code included in the line management code information (step S10).

Then, the management code reception unit receives and gathers the line management code information transmitted from each of the communication apparatuses and relay apparatuses (step S12), and the management code comparator 54 compares the line management code of the line management code information received from each of the communication apparatuses and relay apparatuses with a corresponding line management code registered in the management code DB 50 (step S13).

In the case where the compared line management code information match, the process moves on to step S14 where a corresponding communication route display is shown on a display screen, and an arrow representing the corresponding communication route is indicated in blue up to the communication apparatus or relay apparatus transmitting the line management code information. Also, a communication route list is shown in which the corresponding line management code information transmitted by the communication apparatus or relay apparatus is indicated as 'OK'.

On the other hand, in the case where the compared line management code information do not match, the process moves on to step S15 where the arrow representing the corresponding communication route up to the communication apparatus or relay apparatus transmitting the line management code information is indicated in red on the display screen, and the corresponding line management code information transmitted by the communication apparatus or relay apparatus is indicate as 'NG' in the communication route list.

Figure 11:
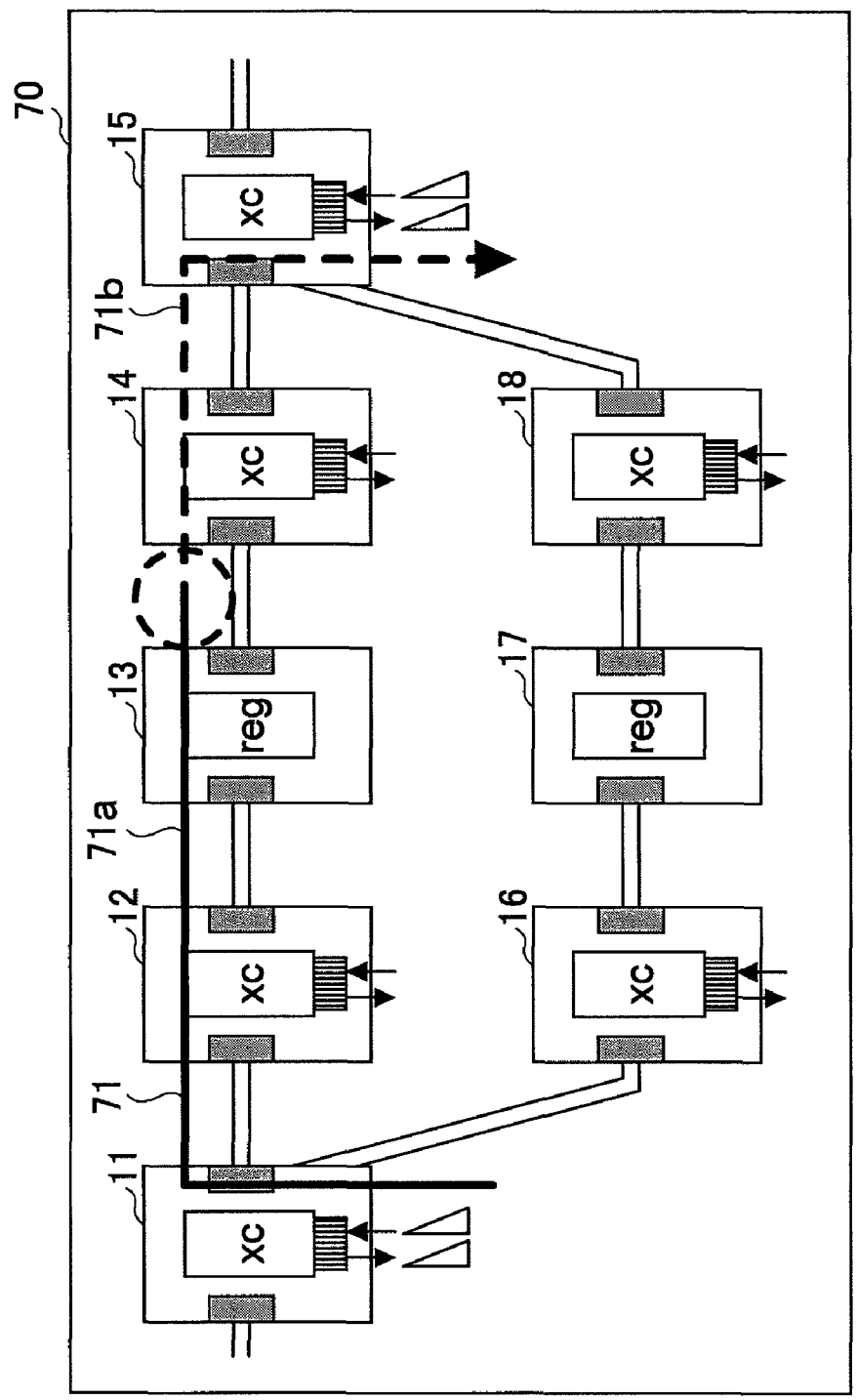
FIG. 11 is a diagram illustrating an exemplary display of a communication route that may be displayed when an error occurs.

For example, when an error occurs in the transmission path between relay apparatus 13 and communication apparatus 14, a communication route display as is shown in FIG. 11 and a communication route list as is shown in FIG. 12 may be displayed.

FIG. 11 shows an exemplary communication route display that is displayed when an error occurs. In this example, the display screen 70 shows the network made up of communication apparatuses 11, 12, 14-16 and relay apparatuses 13 and 17 and a communication route represented by arrow 71. Arrow 71 represents a communication route of a specific channel having a specific line management code, namely, a communication route passing terminal T1, communication apparatuses 11, 12, relay apparatus 13, communication apparatuses 14, 15, and terminal T2. A solid line portion 71a of arrow 71 may be indicated in blue to represent a portion of the communication route that is free of errors, and a broken line portion 71b of arrow 71 may be indicated in red to represent a portion of the communication route in which an error is occurring.

FIG. 12 shows an exemplary communication route list that is displayed when an error occurs. The illustrated communication route list describes the transmission apparatus, the reception apparatus, the pass apparatuses, the transmission apparatus vendor code, the transmission terminal code, the reception terminal code, and the line direction code for each line management code. Further, 'NG' is indicated for the line management codes '00001h' and '00002h', and 'OK' is indicated for the line management codes '00003h' and '00004h'.

The DB updating unit 58 assigns a line management code to a channel that does not have a line management code, determines the corresponding transmission apparatus, reception apparatus, transmission terminal, reception terminal, and pass apparatuses of the channel, and registers such information within the management code DB 50.

The DB updating unit 58 registers line management code information in response to directions from a superordinate apparatus (not shown). In one embodiment, the line management code may be automatically assigned to a channel by registering the corresponding transmission apparatus, reception apparatus, transmission terminal, reception terminal, data amount, and the pass apparatuses, for example. In another embodiment, the pass apparatuses may no be designated, and in such a case, the DB updating unit 58 may automatically determine/register corresponding pass apparatuses of a channel based on information on the free transmission capacity of each communication apparatus, for example.

As can be appreciated, according to an aspect of the present invention, a user may monitor line management code information with respect to all apparatuses included in a network so that a communication route, the free transmission capacity of an apparatus, and the amount of signals passing an apparatus may be immediately determined and the user may always be kept up to date on the latest network status, for example.

According to another aspect of the present invention, a user may monitor line management code information with respect to an error occurring location upon examining an error occurrence so that the status of a line (error location within a transmission path or an apparatus) may be easily determined and the error occurrence may be appropriately handled in a short period of time, for example.

It is noted that in the above-described embodiment, a management apparatus transmission/reception unit for receiving line management code information from the management apparatus may be embodied by the management transmission/reception unit 19, a line management code information output unit for outputting line management code information to a logical line may be embodied by the selector 30, a line management code information extracting unit for extracting line management code information from a transmission signal may be embodied by the line management code extracting units 33 and 46, a line management code information transmission unit for transmitting extracted line management code information to the management apparatus may be embodied by the management transmission/reception unit 19 and the management transmission unit 47, a transmission unit for transmitting line management code information from the management apparatus to the communication apparatuses may be embodied by the management code transmission unit 52, a reception unit for receiving extracted line management code information from the communication apparatuses may be embodied by the management code reception unit 53, and an analyzing unit for analyzing the status of the network may be embodied by the management code comparator 54, the route analyzing unit 55, the capacity compiling unit 56, and the error determining unit 57.

Although the present invention is shown and described with respect to certain preferred embodiments, it is obvious that equivalents and modifications may occur to others skilled in the art upon reading and understanding the specification. The present invention includes all such equivalents and modifications, and is limited only by the scope of the claims.

What is claimed is:

1. A network information analyzing method for determining a status of a network including a plurality of communication apparatuses, the method comprising:
    registering line management code information in a management apparatus, the line management code information including a line identifier identifying each of the plural communication apparatuses in correspondence with each logical line;
    assigning the line identifier to each logical line used for establishing data communication between a transmission terminal and a reception terminal within the network;
    transmitting from the management apparatus to the communication apparatuses the line management code information including the line identifier;
    controlling each communication apparatus receiving the line management code information to output the received line management code information to the logical line identified by the line identifier included in the received line management code information;
    controlling each communication apparatus to extract the line management code information from a transmission signal, attach a corresponding apparatus identifier assigned to the communication apparatus to the extracted line management code information, and transmit the extracted line management code information attached with the corresponding apparatus identifier to the management apparatus; and
    analyzing the status of the network and determining a communication apparatus of an error occurring location and a channel of the error occurring location at the management apparatus based on the extracted line management code information attached with the corresponding apparatus identifier received from each communication apparatus;
    wherein the registering of the line management code information is performed before the transmitting of the line management code information;
    wherein the line management code information includes at least one of an apparatus identifier assigned to each communication apparatus, a line direction code corresponding to the line identifier, and data amount corresponding to the line identifier.

2. The network analyzing method as claimed in claim 1, wherein
    the management apparatus analyzes a transmission path with respect to each line identifier.

3. The network analyzing method as claimed in claim 1, wherein
    the management apparatus compiles an amount of signals passing through each communication apparatus.

4. The network analyzing method as claimed in claim 1, wherein
    the management apparatus determines an error occurring location based on the extracted line management code information and the corresponding apparatus identifier received from each communication apparatus.

5. A communication apparatus used in implementing a network analyzing method for analyzing a status of a network including a plurality of the communication apparatuses, said communication apparatus comprising:
    a management apparatus transmission/reception unit that receives line management code information including a line identifier assigned to a logical line used for establishing data communication between a transmission terminal and a reception terminal within the network which line management code information is transmitted from a management apparatus that manages the network, the line management code information being registered in the management apparatus;
    a line management code information output unit that outputs the received line management code information to the logical line identified by the line identifier included in the received line management code information;

a line management code information extracting unit that extracts the line management code information from a transmission signal; and a line management code information transmission unit that attaches a corresponding apparatus identifier assigned to the communication apparatus to the extracted line management code information and transmits the extracted line management code information attached with the corresponding apparatus identifier to the management apparatus;

wherein the registering of the line management code information is performed before the transmitting of the line management code information;

wherein the line management code information includes at least one of an apparatus identifier assigned to each communication apparatus, a line direction code corresponding to the line identifier, and data amount corresponding to the line identifier.

6. A relay apparatus used in implementing a network analyzing method for analyzing a status of a network including a plurality of communication apparatuses, the relay apparatus comprising:

a line management code information extracting unit that extracts line management code information including a line identifier assigned to a logical line used for establishing data communication between a transmission terminal and a reception terminal from a transmission signal, the line management code information being registered in a management apparatus; and a line management code information transmission unit that attaches a corresponding apparatus identifier assigned to the relay apparatus to the extracted line management code information and transmits extracted line management code information attached with the corresponding apparatus identifier to the management apparatus;

wherein the registering of the line management code information is performed before the transmitting of the line management code information;

wherein the line management code information includes at least one of an apparatus identifier assigned to each communication apparatus, a line direction code corresponding to the line identifier, and data amount corresponding to the line identifier.

7. A management apparatus used in implementing a network analyzing method for analyzing a status of a network including a plurality of communication apparatuses, the management apparatus comprising:

a database that assigns a line identifier to each logical line used for establishing data communication between a transmission terminal and a reception terminal within the network and registers line management code information including the line identifier in the management apparatus;

a transmission unit that transmits the registered line management code information to the communication apparatuses;

a reception unit that receives from the communication apparatuses extracted line management code information extracted by the communication apparatuses and a corresponding apparatus identifier assigned to each communication apparatus attached to the extracted line management code information; and an analyzing unit that analyzes the status of the network and determines a communication apparatus of an error occurring location and a channel of the error occurring location based on the extracted line management code information attached with the corresponding apparatus identifier received from each communication apparatus;

wherein the registering of the line management code information is performed before the transmitting of the line management code information;

wherein the line management code information includes at least one of an apparatus identifier assigned to each communication apparatus, a line direction code corresponding to the line identifier, and data amount corresponding to the line identifier.

8. The management apparatus as claimed in claim 7, wherein
the analyzing unit includes a route analyzing unit that analyzes a transmission path of each logical line.

9. The management apparatus as claimed in claim 7, wherein
the analyzing unit includes a capacity compiling unit that compiles an amount of signals passing each communication apparatus.

10. The management apparatus as claimed in claim 7, wherein
the analyzing unit includes an error determining unit that determines an error occurring location within each logical line.

* * * * *